United States Patent
Takai et al.

(10) Patent No.: US 9,492,877 B2
(45) Date of Patent: Nov. 15, 2016

(54) DRILL

(75) Inventors: Kazuteru Takai, Toyokawa (JP);
Kazutoyo Itoh, Toyokawa (JP);
Hiroyuki Amano, Toyokawa (JP)

(73) Assignee: OSG CORPORATION, Toyokawa-shi (JP)

( * ) Notice: Subject to any disclaimer, the term of this patent is extended or adjusted under 35 U.S.C. 154(b) by 107 days.

(21) Appl. No.: 14/342,029

(22) PCT Filed: Sep. 6, 2011

(86) PCT No.: PCT/JP2011/070296
§ 371 (c)(1),
(2), (4) Date: Feb. 28, 2014

(87) PCT Pub. No.: WO2013/035166
PCT Pub. Date: Mar. 14, 2013

(65) Prior Publication Data
US 2014/0219737 A1    Aug. 7, 2014

(51) Int. Cl.
*B23B 51/02*    (2006.01)
*B23B 51/06*    (2006.01)

(52) U.S. Cl.
CPC .............. *B23B 51/02* (2013.01); *B23B 51/06* (2013.01); *B23B 2222/28* (2013.01); *B23B 2251/04* (2013.01); *B23B 2251/08* (2013.01); *B23B 2251/12* (2013.01); *B23B 2251/125* (2013.01); *B23B 2251/14* (2013.01); *B23B 2251/18* (2013.01); *B23B 2251/241* (2013.01);
(Continued)

(58) Field of Classification Search
CPC .............. B23B 51/02; B23B 2251/14; B23B 2251/08; Y10T 408/9097; Y10T 408/909; Y10T 408/9095
See application file for complete search history.

(56) References Cited

U.S. PATENT DOCUMENTS 2,859,645 A    11/1958  Emmons
4,065,224 A *  12/1977  Siddall ................. B23B 51/02
                                                 408/230
(Continued)

FOREIGN PATENT DOCUMENTS

CN    1396030 A    2/2003
CN   101821043 A    9/2010
(Continued)

OTHER PUBLICATIONS

Mar. 23, 2015 Extended Search Report issued in European Patent Application No. 11872005.1.
(Continued)

*Primary Examiner* — Daniel Howell
*Assistant Examiner* — Chwen-Wei Su
(74) *Attorney, Agent, or Firm* — Oliff PLC

(57) ABSTRACT

A drill includes: a chip discharge flute opened in a tip surface; and a cutting edge formed at an intersecting portion between an inner wall surface of the chip discharge flute on a side of a drill rotation direction and a tip flank formed on the tip surface, the cutting edge being made up of a concavely-curved cutting edge portion formed on an inner circumferential side and a convexly-curved cutting edge portion formed on an outer circumferential side, a cross section orthogonal to an axial center having a first convex curve corresponding to the convexly-curved cutting edge portion and a first concave curve corresponding to the concavely-curved cutting edge portion intersecting with each other.

8 Claims, 13 Drawing Sheets

(52) U.S. Cl.
CPC ......... *B23B2251/40* (2013.01); *Y10T 408/909* (2015.01); *Y10T 408/9095* (2015.01); *Y10T 408/9097* (2015.01)

(56) References Cited

U.S. PATENT DOCUMENTS

| | | | |
|---|---|---|---|
| 4,975,003 A | 12/1990 | Hosoi | |
| 5,160,232 A * | 11/1992 | Maier | B23B 51/02 407/54 |
| 5,230,593 A | 7/1993 | Imanaga et al. | |
| 5,678,960 A | 10/1997 | Just et al. | |
| 6,213,692 B1 * | 4/2001 | Guehring | B23B 51/02 408/144 |
| 6,309,149 B1 * | 10/2001 | Borschert | B23B 51/02 408/1 R |
| 6,315,504 B1 | 11/2001 | Sekiguchi et al. | |
| 6,916,139 B2 | 7/2005 | Yanagida et al. | |
| 6,923,602 B2 | 8/2005 | Osawa et al. | |
| 7,201,543 B2 | 4/2007 | Muhlfriedel et al. | |
| 7,214,006 B2 * | 5/2007 | Flynn | B23C 5/10 407/53 |
| 7,762,748 B2 | 7/2010 | Yanagida et al. | |
| 9,216,460 B2 | 12/2015 | Matsuda et al. | |
| 2003/0039522 A1 | 2/2003 | Yanagida et al. | |
| 2003/0215297 A1 | 11/2003 | Frisendahl | |
| 2005/0135889 A1 | 6/2005 | Turrini et al. | |
| 2006/0269372 A1 | 11/2006 | Goshima | |
| 2008/0199268 A1 | 8/2008 | Krenzer et al. | |
| 2010/0215452 A1 | 8/2010 | Jindai et al. | |
| 2011/0170974 A1 | 7/2011 | Masuda | |

FOREIGN PATENT DOCUMENTS

| | | | |
|---|---|---|---|
| CN | 102170989 A | | 8/2011 |
| DE | 3826239 A1 * | 2/1990 | ............. B23B 51/02 |
| EP | 0 320 881 A2 | | 6/1989 |
| EP | 1 275 458 A1 | | 1/2003 |
| FR | 2 793 176 A1 | | 11/2000 |
| JP | 63093509 A * | | 4/1988 |
| JP | A-63-89211 | | 4/1988 |
| JP | 01005708 A * | | 1/1989 |
| JP | A-2000-198011 | | 7/2000 |
| JP | A-2003-25125 | | 1/2003 |
| JP | 2003-220507 A | | 8/2003 |
| JP | 2003266224 A * | | 9/2003 |
| JP | 2003-285211 A | | 10/2003 |
| JP | 2006110704 A * | | 4/2006 |
| JP | 2006136965 A * | | 6/2006 |
| JP | A-2006-326790 | | 12/2006 |
| JP | 2007-301706 A | | 11/2007 |
| WO | WO 2010-038279 A1 | | 4/2010 |
| WO | 2010/146839 A1 | | 12/2010 |

OTHER PUBLICATIONS

International Search Report issued in International Patent Application No. PCT/JP2011/070296 dated Nov. 8, 2011.
Mar. 16, 2015 Office Action issued in Chinese Application No. 201180073268.2.
Dec. 2, 2014 Office Action issued in Japanese Patent Application No. 2013-541583.
May 27, 2015 Office Action issued in Chinese Patent Application No. 201180074644.X.
Jun. 23, 2015 Search Report issued in European Patent Application No. 11874910.0.
U.S. Appl. No. 14/353,399, filed Apr. 22, 2014 in the name of Takai et al.
Jan. 17, 2012 International Search Report and Written Opinion issued in PCT/JP2011/075518.
Apr. 18, 2016 Office Action Issued in U.S. Appl. No. 14/353,399.
Aug. 22, 2016 Notice of Allowance issued in U.S. Appl. No. 14/353,399.

* cited by examiner

FIG.6

| WORK MATERIAL | | | | | | | | | | | | | | | | | | |
|---|---|---|---|---|---|---|---|---|---|---|---|---|---|---|---|---|---|---|
| LOW CARBON STEEL | MEDIUM CARBON STEEL | HIGH CARBON STEEL | ALLOY STEEL | HEAT TREATED STEEL | HARDENED STEEL | | | STAINLESS STEEL | TOOL STEEL | CAST IRON | DUCTILE CAST IRON | COPPER ALLOY | ALUMINUM EXTENSION MATERIAL | ALUMINUM ALLOY CASTING | TITANIUM | TITANIUM ALLOY | INCONEL | COMPOSITE MATERIAL | MAGNESIUM ALLOY | METAL MATRIX COMPOSITE (MMC) |
| C~0.25% | C0.25~0.45% | C0.45%~ | SCM | ~35 HRC | 35~45 HRC | 45~50 HRC | 50~62 HRC | 62~70 HRC | SUS | SKD SKS | FC | FCD | Cu | AL | AC | Ti | | | CFRP | AZ91D |
| ◎ | ◎ | ◎ | ◎ | ◎ | ○ | ○ | | | ◎ | ○ | ◎ | ◎ | ○ | | ○ | ○ | ◎ | | ○ | |

STRAIGHT CUTTING EDGE DRILL

HOOKED CUTTING EDGE DRILL

TYPE-1 DRILL

TYPE-2 DRILL

FIG.19

| No. | FLUTE FORM FORMATION ELEMENTS (RATE×D) | | | | | | | |
|---|---|---|---|---|---|---|---|---|
| | R1 | R2 | R3 | R4 | R3/R2 | WEB THICKNESS CD | LF | LW |
| 1 | 0.16D | 0.29D | 0.31D | 0.21D | 1 | 0.28D | 0.02D | 0.05D |
| 2 | 0.16D | 0.29D | 0.25D | 0.21D | 0.83 | 0.28D | 0.02D | 0.05D |
| 3 | 0.018D | 0.29D | 0.29D | 0.21D | 1.21 | 0.28D | 0.04D | 0.005D |
| 4 | 0.16D | 0.29D | 0.31D | 0.21D | 0.7 | 0.28D | 0.02D | 0.05D |
| 5 | 0.16D | 0.29D | 0.25D | 0.21D | 1.3 | 0.28D | 0.02D | 0.05D |
| 6 | 0.018D | 0.29D | 0.29D | 0.21D | 1 | 0.28D | 0.04D | 0.005D |
| 7 | 0.16D | 0.19D | 0.29D | 0.21D | 1.53 | 0.28D | 0.06D | 0.05D |
| 8 | 0.42D | 0.29D | 0.29D | 0.21D | 1 | 0.28D | 0.02D | 0.05D |
| 9 | 0.16D | 0.52D | 0.29D | 0.21D | 0.56 | 0.28D | -0.02D | 0.09D |
| 10 | 0.16D | 0.29D | 0.31D | 0.21D | 1.07 | 0.13D | 0.04D | 0.05D |
| 11 | 0.16D | 0.29D | 0.31D | 0.21D | 1.07 | 0.42D | 0 | 0.05D |
| 12 | 0.38D | 0.14D | 0.29D | 0.21D | 0.48 | 0.28D | 0.06D | 0.12D |

FIG.20

| No. | CUTTING TEST RESULT | | |
|---|---|---|---|
| | CHIP SHAPE | THRUST LOAD | DURABILITY PERFORMANCE |
| 1 | ○ | ○ | ○ |
| 2 | ○ | ○ | ○ |
| 3 | ○ | ○ | ○ |
| 4 | △ | △ | ×:BREAKAGE DUE TO CLOGGING |
| 5 | △ | △ | ×:BREAKAGE DUE TO RIGIDITY SHORTAGE |
| 6 | ○ | △ | △:CORNER PORTION CRACK |
| 7 | △ | △ | △:CORNER PORTION CRACK |
| 8 | ○ | △ | △:CORNER PORTION CRACK |
| 9 | × | × | △:SIGNIFICANT WEAR |
| 10 | ○ | △ | ×:BREAKAGE |
| 11 | △ | × | ×:BREAKAGE |
| 12 | △ | × | △:CORNER PORTION CRACK |

DRILL

TECHNICAL FIELD

The present invention relates to a drill that is a rotary cutting tool for hole machining through cutting and is particularly related to a technique of forming chips into a curled short shape without a needle-like projection and smoothly discharging the chips to suppress damage of a drill and further improve a tool life.

CONVENTIONAL ART

A drill frequently used as a hole tool is disposed with a cutting edge at an axial tip and a chip discharge flute in an axial direction and is rotated around an axial center to perform cutting with the cutting edge at the tip while discharging chips through the chip discharge flute.

Drills described in Patent Documents 1 and 2 are examples thereof. These drills have an inner circumferential portion of a cutting edge formed into a concave curve and an outer circumferential portion formed into a convex corner shape to define an obtuse intersection angle with a margin portion on a drill cross section and are considered to achieve curling of chips and an improvement in strength of the outer circumferential portion of the cutting edge and to have drill durability. However, since a corner convex portion is disposed on the outer circumferential portion of the cutting edge, generated chips tend to be segmented at a portion corresponding to the corner convex portion, tangling with each other to generate clogging of chips, and since the chips cut on the outer circumferential side relative to the corner convex portion are caused to flow toward the outer circumference, poor curling property and low discharging property may make a resistance applied to the drills larger, compromising the drill durability.

In this regard, a drill described in Patent Document 3 has been proposed. This drill has a convexly-curved cutting edge portion formed into a convexly-curved shape convexed in a drill rotation direction on the outer circumferential end side of a cutting edge and has a concavely-curved cutting edge portion formed into a concavely-curved shape concaved in the drill rotation direction on the inner circumferential side of the convexly-curved cutting edge portion, and the convexly-curved cutting edge portion and the concavely-curved cutting edge portion are smoothly continued. Therefore, an obtuse intersection angle is made between the cutting edge and a margin portion on the outer circumference of a drill main body, increasing the strength to prevent cracking and chipping from occurring, and since the chips cut by the cutting edge are not segmented at the inner/outer circumferences of the cutting edge and the chips are rolled into the inner circumferential side and sufficiently curled by the convexly-curved cutting edge portion, the chips are smoothly discharged and the tool durability is enhanced.

PRIOR ART DOCUMENTS

Patent Documents

Patent Document 1: Japanese Laid-Open Patent Publication No. 2000-198011
Patent Document 2: Japanese Laid-Open Patent Publication No. 2006-326790
Patent Document 3: Japanese Laid-Open Patent Publication No. 2003-025125

SUMMARY OF THE INVENTION

Problem to be Solved by the Invention

However, although the conventional drill described in Patent Document 3 curls chips generated from the cutting edge, since the chips include those having a longer overall length with a needle-like projection like chips generated by a straight cutting edge at a high proportion, the discharge property of chips is still insufficient and cracking and chipping occur in the drill in the course of repeating the cutting, resulting in a problem of the durability of the drill considered not necessarily sufficient. Such a problem becomes prominent in a long drill for deep hole machining.

The present invention was conceived in view of the situations and it is therefore an object of the present invention to provide a drill that achieves a shape of chips curled without a needle-like projection and accordingly shortened in overall length and that more smoothly discharges the chips to further improve a tool life.

Means for Solving the Problem

To achieve the object, the present invention provides a drill comprising: a chip discharge flute opened in a tip surface; and a cutting edge formed at an intersecting portion between an inner wall surface of the chip discharge flute on a side of a drill rotation direction and a tip flank formed on the tip surface, the cutting edge being made up of a concavely-curved cutting edge portion formed on an inner circumferential side and a convexly-curved cutting edge portion formed on an outer circumferential side, wherein a cross section orthogonal to an axial center has a first convex curve corresponding to the convexly-curved cutting edge portion and a first concave curve corresponding to the concavely-curved cutting edge portion intersecting with each other.

Effects of the Invention

To achieve the object, according to the drill of the present invention which comprises: the chip discharge flute opened in the tip surface; and the cutting edge formed at the intersecting portion between the inner wall surface of the chip discharge flute on the side of the drill rotation direction and the tip flank formed on the tip surface, the cutting edge being made up of the concavely-curved cutting edge portion formed on the inner circumferential side and the convexly-curved cutting edge portion formed on the outer circumferential side, since the cross section orthogonal to the axial center of the drill has the first convex curve corresponding to the convexly-curved cutting edge portion and the first concave curve corresponding to the concavely-curved cutting edge portion intersecting with each other, chips generated from the cutting edge are curled and formed into a shape having no needle-like projection and accordingly relatively shortened in overall length and are smoothly discharged with enhanced discharge property and, therefore, the tool life of the drill is further improved.

Preferably, the cross section orthogonal to the axial center has a concave amount LF of the first concave curve set to 0.01D to 0.05D (where D is a drill cutting diameter) relative to a reference line connecting an outer circumferential point, at which an outer circumferential surface of the drill intersects with the first convex curve, and a drill center point. Consequently, the chip shape is curled with a relatively shorter overall length and the durability performance is enhanced while a thrust load during cutting is reduced. If the concave amount LF of the first concave curve becomes less than 0.01D, wear of the drill increases and the durability performance deteriorates.

Preferably, the cross section orthogonal to the axial center has a rake chamfer width LW of 0.008D to 0.06D (where D is a drill cutting diameter) that is a distance from an intersection between a straight line orthogonal to the reference line, which passes through an intersection of the first convex curve and the first concave curve, and the reference line, to the outer circumferential point. Consequently, the chip shape is curled with a relatively shorter overall length and the durability performance is enhanced while the thrust load during cutting is reduced.

Preferably, a rake angle is negative that is an angle between the reference line and the first convex curve at the outer circumferential point. Consequently, a corner portion corresponding to the outer circumferential point is enhanced in strength and prevented from cracking, and the durability performance of the drill is enhanced.

Preferably, the drill has a web thickness CD of 0.15D to 0.4D (where D is a drill cutting diameter). Consequently, transverse strength of the drill is enhanced within a range of the achieved chip discharge property and, therefore, the durability performance of the drill is enhanced.

Preferably, the cross section orthogonal to the axial center has an inner wall surface of the chip discharge flute on a side of rotation direction opposite to the drill rotation direction made up of a second concave curve formed on an inner circumferential side and a second convex curve formed on an outer circumferential side adjacently to the second concave curve, and the second convex curve reaches a heel portion. Consequently, the chip shape is curled with a relatively shorter overall length and the durability performance is enhanced while the thrust load during cutting is reduced, and since the first convex curve and the second convex curve respectively reinforce the corner portion corresponding to the both end portions, i.e., the heel portion and a margin portion, of an opening edge opened in a C-shape or a U-shape in the tip surface of the chip discharge flute, the corner portion and the margin portion is prevented from cracking and the durability of the drill is enhanced.

Preferably, when R1, R2, R3, and R4 are a curvature radius of the first convex curve, a curvature radius of the first concave curve, a curvature radius of the second concave curve, and a curvature radius of the second convex curve, respectively, the drill is set to R1: 0.02D to 0.4D and R2: 0.15D to 0.5D. Consequently, the chip shape is curled with a relatively shorter overall length and the durability performance is enhanced while the thrust load during cutting is reduced.

Preferably, a relationship between the curvature radius of the first concave curve and the curvature radius of the second concave curve is $0.75 \leq R3/R2 \leq 1.25$. Consequently, the chip discharge flute is formed into a cross section shape having a size without clogging of chips within a range in which rigidity of the drill is ensured. If R3/R2 becomes less than 0.75, the cross section area of the chip discharge flute becomes too small and the clogging of chips occurs and causes breakage of the drill.

BRIEF DESCRIPTION OF THE DRAWINGS

FIG. 6 is a chart of types of work materials used in cutting by the drill in the example of FIG. 1.

FIG. 19 is a chart of cross section shapes of eleven types of drills No. 1 to No. 12 having mutually different shapes as the TYPE-1 drill used in a cutting test 3.

FIG. 20 is a chart of cutting test results in the cutting test 3 each of the eleven types of the drills No. 1 to No. 12.

MODE FOR CARRYING OUT THE INVENTION

An example of the present invention will now be described in detail with reference to the drawings.

EXAMPLE

Figure 1:
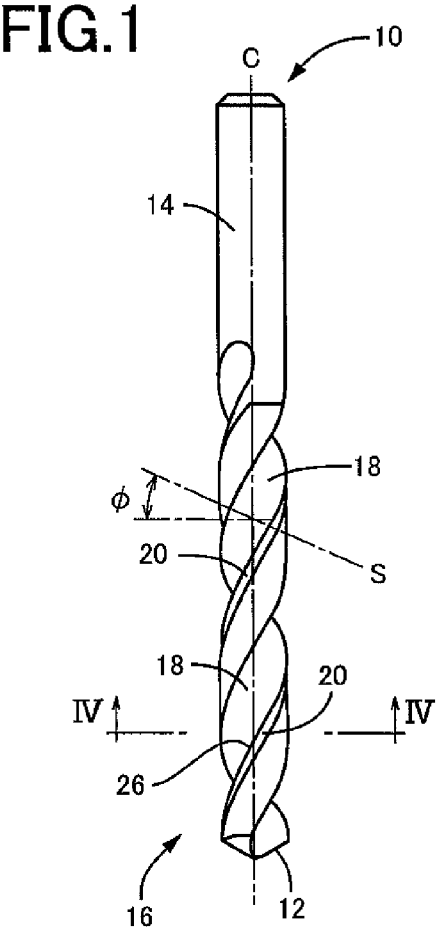
FIG. 1 is a front view of a drill that is an example of the present invention.
Figure 2:
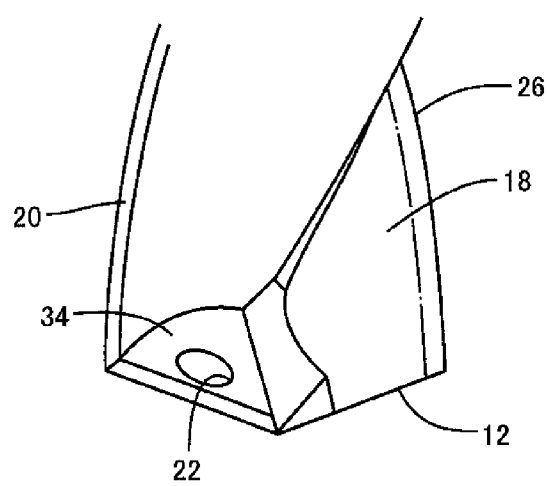
FIG. 2 is an enlarged view of a tip portion of the drill in the example of FIG. 1.
Figure 3:
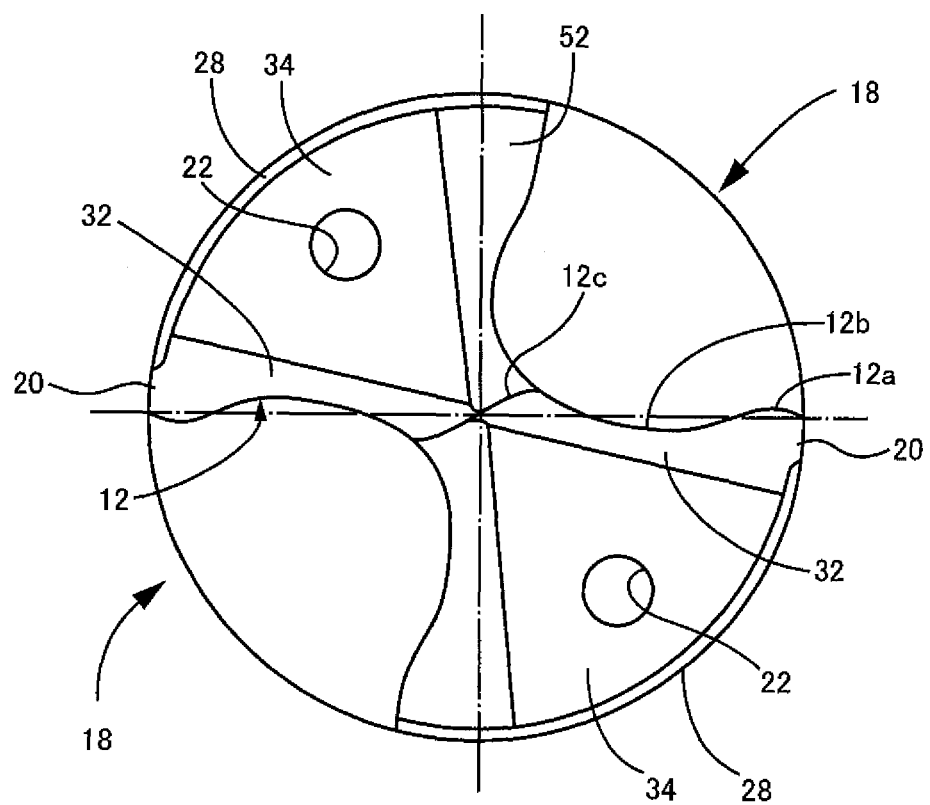
FIG. 3 is an enlarged view of a tip surface viewed from one end of the drill in the example of FIG. 1.
Figure 4:
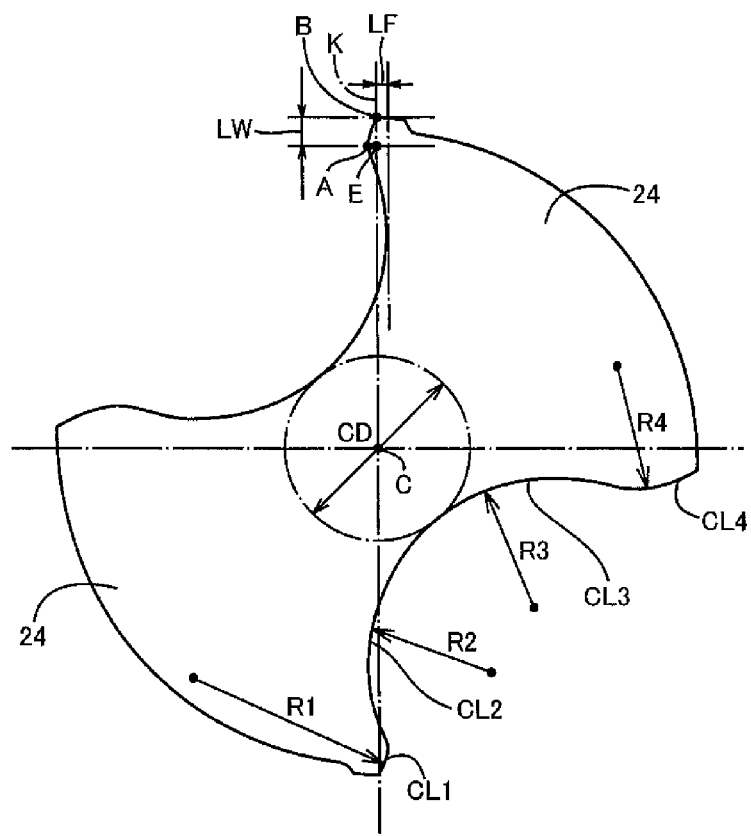
FIG. 4 is a diagram for explaining a cross section shape of the chip discharge flute in a cross section orthogonal to an axial center C of the drill of FIG. 1 and is a cross-sectional view taken along the line IV-IV in FIG. 1.
Figure 5:
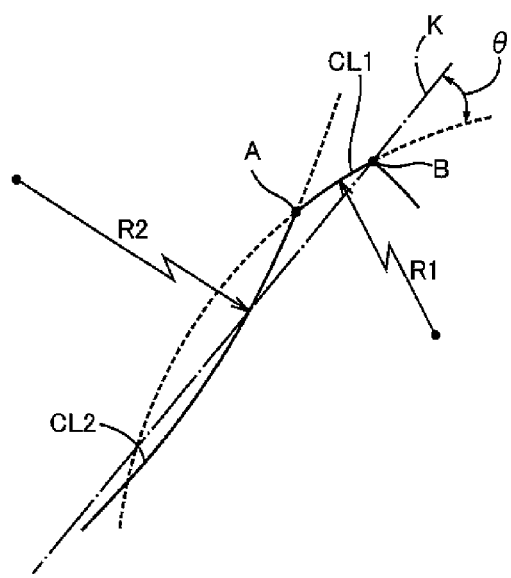
FIG. 5 is an enlarged view for specifically explaining a connecting shape between the first convex curve and the first concave curve in the cross section shape of the chip discharge flute of FIG. 4.

FIG. 1 is a diagram of a drill 10 that is an example of the present invention and is a front view from a direction orthogonal to an axial center C. FIG. 2 is an enlarged view of a tip portion disposed with a cutting edge 12 of the drill 10. FIG. 3 is an enlarged view of a tip surface disposed with the cutting edge 12 of the drill 10. FIG. 4 is a cross-sectional view of the drill 10 cut along a surface orthogonal to the axial center C. FIG. 5 is an enlarged view of an end edge portion of an inner wall surface of a chip discharge flute 18 on the drill rotation direction side in the cross-sectional view.

The drill 10 is a two-flute twist drill and axially integrally includes a shank portion 14 and a flute portion 16. The drill 10 is made of cemented carbide, and the surfaces of a tip portion disposed with the cutting edges 12 etc., and the flute portion 16 disposed with the chip discharge flutes 18 are coated with a hard film of TiAlN alloy. The flute portion 16 has a pair of the chip discharge flutes 18 twisted clockwise around the axial center C at a predetermined helix angle γ (e.g., about 30 degrees) and margins 20 are disposed along the chip discharge flutes 18. The pair of the chip discharge flutes 18 is opened in a C-shape in a tapered tip surface of the drill 10 and respective cutting edges 12 are disposed on opening edges of the chip discharge flutes 18 on the side toward the rotation direction of the drill 10 i.e. facing in the rotation direction of the drill 10.

The margin 20 is disposed along a leading edge 26 that is an end edge of a land 24 separated by the chip discharge flutes 18 on the drill rotation direction side. An outer circumferential surface of the drill 10 is made up of an outer circumferential surface of the margin 20, a second clearance 28 disposed with a constant radial dimension after the margin 20. An outer diameter of the margin 20 is substantially the same dimension as a drill diameter (outer diameter of the cutting edges 12) D at the tip portion of the drill 10 and is gradually reduced to a smaller diameter from the tip portion of the drill 10 toward the shank portion 14 through a predetermined back taper.

The cutting edge 12 is made up of a convexly-curved cutting edge portion 12a formed on the outer circumferential side and a concavely-curved cutting edge portion 12b formed on the inner circumferential side. The tapered tip surface of the drill 10 is disposed with a second flank 32 and a third flank 34 behind each of the pair of the cutting edges 12 in the rotation direction. The third flank 34 has an oil hole 22 helically disposed to longitudinally pass through the drill 10 in substantially parallel with the chip discharge flutes 18 and opened such that cutting fluid or air can be supplied to a cutting part as needed. An axial center side portion, i.e., a web thickness portion, of the cutting edge 12 is subjected to R-type thinning and an R-shaped axial center side cutting edge portion 12c smoothly curved on the bottom view of FIG. 3 is disposed to be smoothly connected to the concavely-curved cutting edge portion 12b.

The chip discharge flute 18 is ground by using a plurality of types of fluting grindstones and has an asymmetrical flute cross-sectional shape. As depicted in FIGS. 4 and 5, the inner wall surface of the chip discharge flute 18 is C-shaped, and the inner wall surface on the drill rotation direction side is made up of a first convex curve CL1 corresponding to the convexly-curved cutting edge portion 12a and having a curvature radius R1 and a first concave curve CL2 corresponding to the concavely-curved cutting edge portion 12b and having a curvature radius R2 intersecting with each other. As depicted in FIG. 4, the inner wall surface of the chip discharge flute 18 on the rear side of the drill rotation direction is made up of a second concave curve CL3 having a curvature radius R3 and smoothly connected to the first concave curve CL2 and a second convex curve CL4 having a curvature radius R4 and smoothly connected to the second concave curve CL3. In this example, since the first convex curve CL1 corresponding to the convexly-curved cutting edge portion 12a is a convex surface having the curvature radius R1 projecting in the rotation direction, the strength against crack is increased as compared to the drills of Patent Documents 1 and 2 having a chamfer-like flat surface.

As depicted in FIG. 5, the convexly-curved cutting edge portion 12a on the outer circumferential side and the concavely-curved cutting edge portion 12b on the inner circumferential side making up the cutting edge 12 have the first convex curve CL1 and the first concave curve CL2 corresponding thereto and intersecting with each other, and a slight ridgeline is formed at an intersection A thereof as indicated by a dashed-dotted line of FIG. 2. Since chips generated from the cutting edge are generated by the concavely-curved cutting edge portion 12b corresponding to the first concave curve CL2 and the inner wall surface, the intersection A is desirably positioned closer to the outer circumference as far as possible so as to acquire curled chips with a shorter overall length. Since the drill 10 of this example has the first convex curve CL1 corresponding to the convexly-curved cutting edge portion 12a on the outer circumferential side and the first concave curve CL2 corresponding to the concavely-curved cutting edge portion 12b on the inner circumferential side intersected with each other as described above, the intersection A, i.e., a connection point between the first convex curve CL1 and the first concave curve CL2, is preferably positioned closer to the outer circumference as compared to the conventional drill described in Patent Document 3 having the first convex curve CL1 and the first concave curve CL2 smoothly connected along a tangential direction.

In FIG. 4, the drill 10 of this example has a concave amount LF of the first concave curve CL2 set within a range of 0.01D to 0.05D (where D is a drill cutting diameter) relative to a reference line K connecting an outer circumferential point B, at which the outer circumferential surface of the drill 10 intersects with the first convex curve CL1, and the axial center C defined as a drill center point. Since the chips are generated by the concavely-curved cutting edge portion 12b corresponding to the first concave curve CL2 having the concave amount LF within the range and the inner wall surface and are formed into a preferred curled shape with a relatively shorter overall length, a durability performance of the drill 10 is enhanced and a thrust load during cutting is reduced.

In FIG. 4, the drill 10 of this example has a rake chamfer width LW set within a range of 0.008D to 0.06D (where D is a drill cutting diameter) that is a radial distance from an intersection E between a straight line orthogonal to the reference line K, which passes through the intersection A of the first convex curve CL1 and the first concave curve CL2, and the reference line K, to the outer circumferential point B. Since the radial dimension of the first convex curve CL1 having the rake chamfer width LW set within the range is preferably made smaller as compared to the conventional drill described in Patent Document 3, the chip shape is curled with a relatively shorter overall length and a needle-like projection is made smaller.

In FIG. 4, the drill 10 of this example has a rake angle θ, i.e., an angle between the reference line K and the first convex curve CL1 at the outer circumferential point B, set to be negative so that the strength of a corner portion corresponding to the vicinity of the outer circumferential point B is enhanced. The drill 10 of this example has a web thickness CD set to 0.15D to 0.4D (where D is a drill cutting diameter) so that a cross section area of the chip discharge flute 18 is increased as much as possible while transverse strength is ensured.

In FIG. 4, the drill 10 of this example has the inner wall surface of the chip discharge flute 18 toward the rear side of the rotation direction, i.e., the inner wall surface of the chip discharge flute 18 facing in the opposite direction of the rotation direction, made up of the second concave curve CL3 formed on the inner circumferential side and the second convex curve CL4 formed on the outer circumferential side adjacently to the second concave curve CL3, and the second convex curve CL4 is set to reach a heel portion of the land 24. The second convex curve CL4 reinforces the heel portion of the land 24.

In FIG. 4, the drill 10 of this example has the curvature radius R1 of the first convex curve CL1, the curvature radius R2 of the first concave curve CL2, the curvature radius R3 of the second concave curve CL3, and the curvature radius R4 of the second convex curve CL4 set within ranges of R1: 0.02D to 0.4D and R2: 0.15D to 0.5D, and a relationship of the curvature radius R2 of the first concave curve CL2 and the curvature radius R3 of the second concave curve CL3 is set within a range of $0.75 \leq R3/R2 \leq 1.25$.

FIG. 6 depicts types of work materials used in cutting by the drill 10 of this example. A double circle of FIG. 6 indicates a material most suitable for the cutting by the drill 10 and a single circle indicates a material suitable for the cutting by the drill 10.

(Cutting Test 1)

A cutting test 1 performed by the present inventors will be described. The cutting test 1 was performed by using a hooked cutting edge drill corresponding to the drill 10 of the inventive product and a straight cutting edge drill having cutting edges formed straight under the following cutting test conditions.

Figure 7:
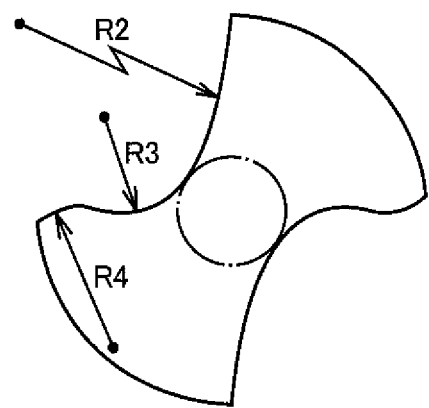
FIG. 7 is a diagram of a cross section shape of a straight cutting edge drill used in cutting in a cutting test 1.
Figure 8:
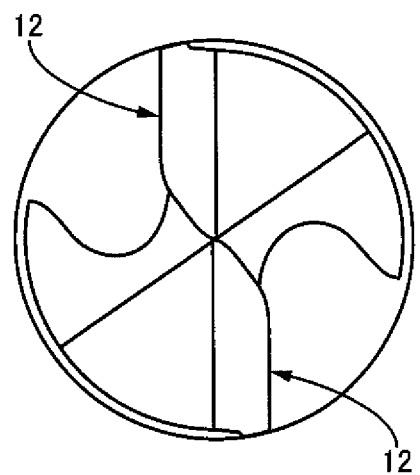
FIG. 8 is a diagram of a tip surface shape of the straight cutting edge drill used in the cutting in the cutting test 1.
Figure 9:
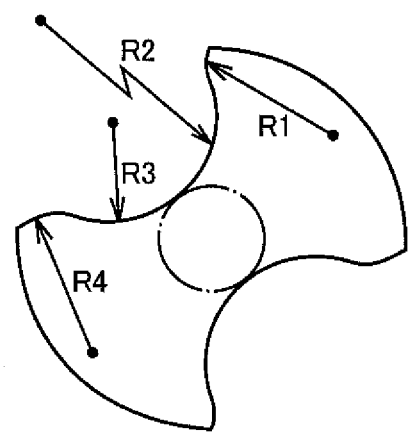
FIG. 9 is a diagram of a cross section shape of a hooked cutting edge drill used in the cutting test 1.
Figure 10:
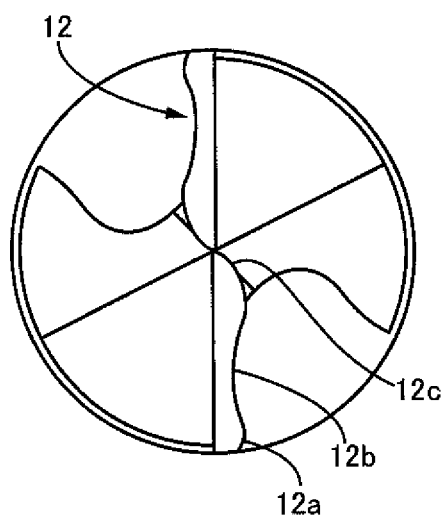
FIG. 10 is a diagram of a tip surface shape of the hooked cutting edge drill used in the cutting test 1.
Figure 11:
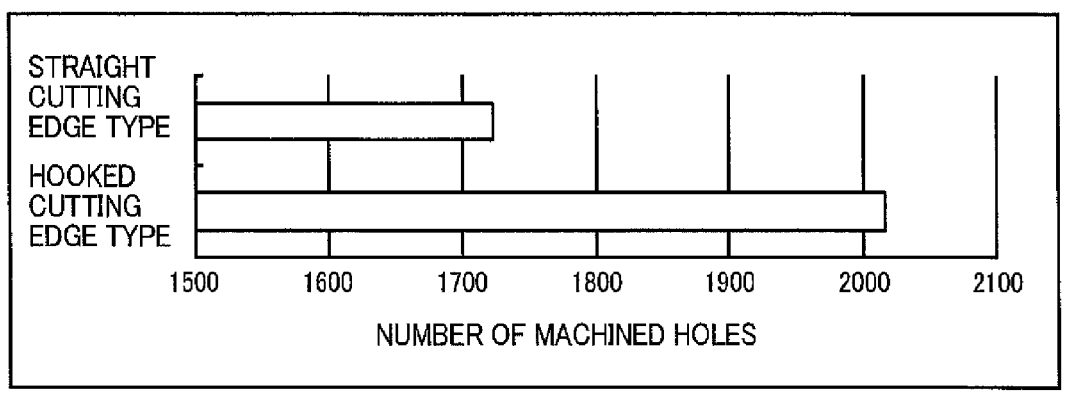
FIG. 11 is a view of a durability result acquired by the straight cutting edge drill and the hooked cutting edge drill used in the cutting test 1.
Figure 12:
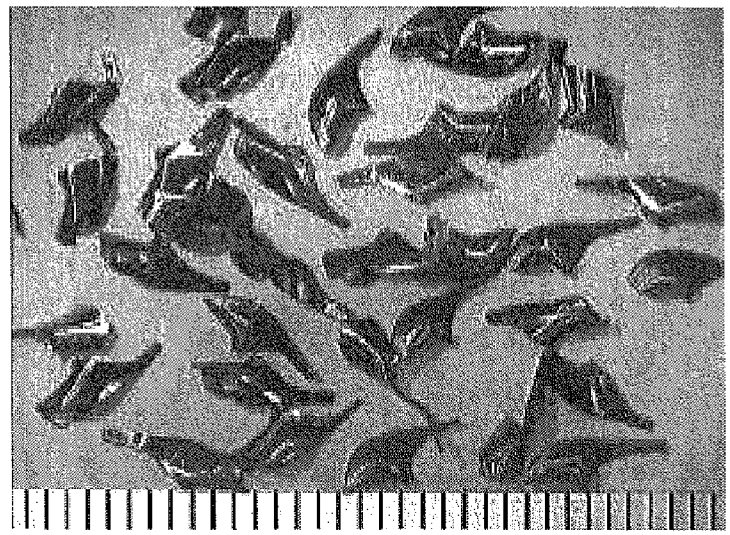
FIG. 12 is a photograph of a chip shape generated in cutting by the straight cutting edge drill in the cutting test 1.
Figure 13:
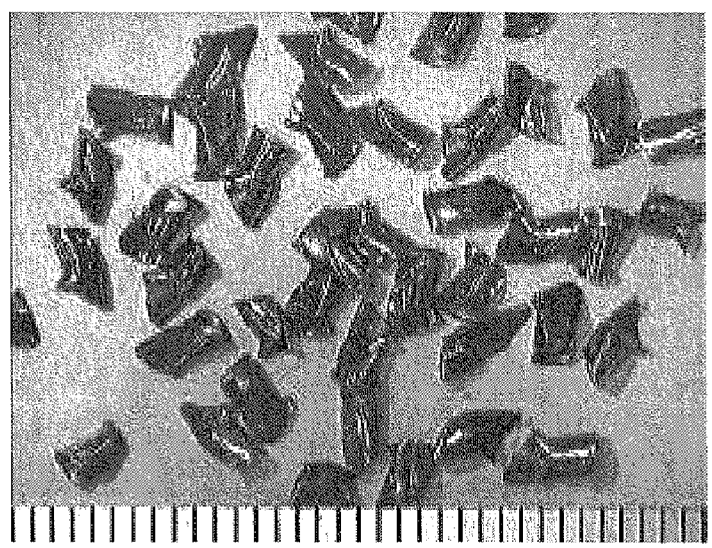
FIG. 13 is a photograph of a chip shape generated in cutting by the hooked cutting edge drill in the cutting test 1.

<Straight Cutting Edge Drill>
Tool material: cemented carbide
Overall length: 82 mm
Flute length: 30 mm
Drill diameter: 6 mmφ
Point angle: 140 degrees
Shape of chip discharge flute: R2=0.94, R3=0.24, R4=0.21
Drill shape: shape depicted in a cross-sectional view of FIG. 7 and an end view of FIG. 8
<Hooked Cutting Edge Drill>
Tool material: cemented carbide
Overall length: 82 mm
Flute length: 30 mm
Drill cutting diameter: 6 mmφ
Point angle: 140 degrees
Shape of chip discharge flute: R1=0.16, R2=0.29, R3=0.29, R4=0.21
Drill shape: shape depicted in a cross-sectional view of FIG. 9 and an end view of FIG. 10
Web thickness: 0.28D
Concave amount LF: 0.02D
Rake chamfer width LW: 0.05D
<Test Conditions>
Work material: SCM440 (30HRC)
Machining depth: 20 mm (blind hole)
Cutting speed: 70 m/min
Feed rate: 0.18 mm/rev
Step: none
Cutting oil: water-soluble coolant (external oil feed)
Coolant: 3 MPa
Web thickness: 0.28D FIG. 11 depicts a durability test result; FIG. 12 depicts a chip shape from the straight cutting edge drill; and FIG. 13 depicts a chip shape from the hooked cutting edge drill. As depicted in FIG. 11, in the hole machining using the straight cutting edge drill, the drill was broken when the number of holes reaches 1720. However, in the hole machining using the hooked cutting edge drill, the drill was not broken even when the number of holes reaches 2010. The durability life is at least increased by about 20%. Comparing the chip shape from the straight cutting edge drill depicted in FIG. 12 with the chip shape from the hooked cutting edge drill depicted in FIG. 13, the chip shape from the straight cutting edge drill is less curled and has a needle-like projection, while the chip shape from the hooked cutting edge drill is further curled and has no needle-like projection, resulting in a smaller overall length, and therefore, the chips from the hooked cutting edge drill are considered to achieve relatively higher discharge property.

(Cutting Test 2)

A cutting test 2 performed by the present inventors will be described. The cutting test 2 was performed by using a TYPE-1 drill having the first convex curve CL1 and the first concave curve CL2 intersecting with each other corresponding to the drill 10 of the inventive product and a TYPE-2 drill having the first convex curve CL1 and the first concave curve CL2 smoothly connected to each other corresponding to the drill of Patent Document 3 under the following cutting test conditions.

Figure 14:
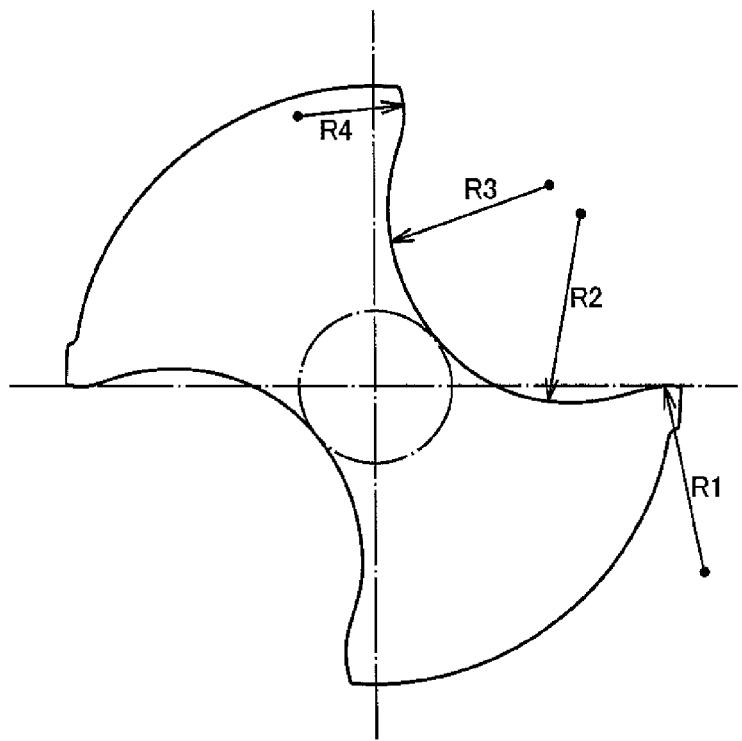
FIG. 14 is a diagram of a cross section shape of a TYPE-2 drill used in a cutting test 2.
Figure 15:
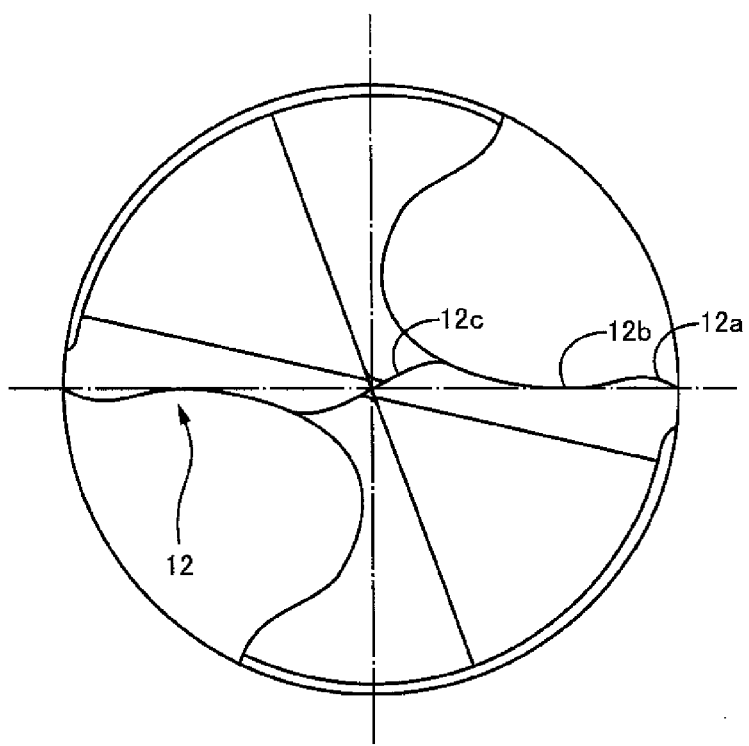
FIG. 15 is a diagram of a tip surface shape of the TYPE-drill used in the cutting test 2.
Figure 16:
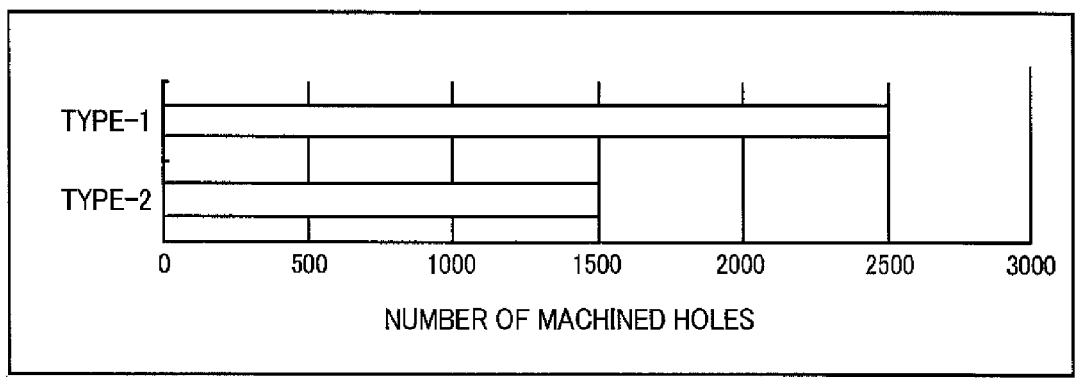
FIG. 16 is a view of a durability result acquired by a TYPE-1 drill and the TYPE-2 drill used in the cutting test 2.
Figure 17:
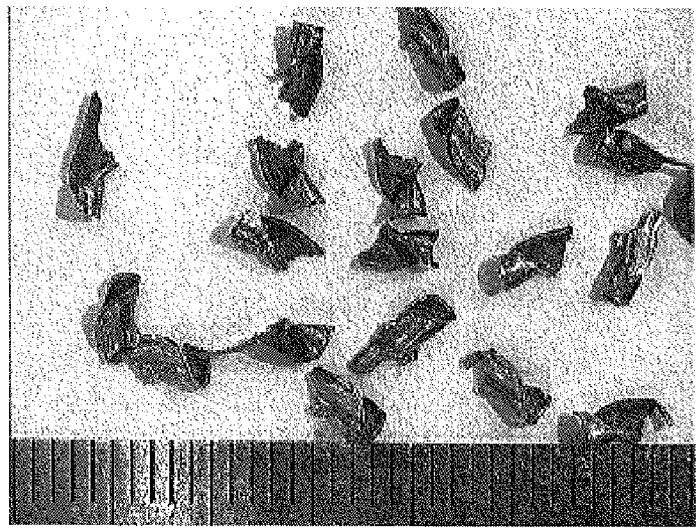
FIG. 17 is a photograph of a chip shape generated in cutting by the TYPE-1 drill in the cutting test 2.
Figure 18:
FIG. 18 is a photograph of a chip shape generated in cutting by the TYPE-2 drill in the cutting test 2.

<TYPE-1 Drill>
Tool material: cemented carbide
Overall length: 100 mm
Flute length: 48 mm
Drill diameter: 6 mmφ
Point angle: 140 degrees
Shape of chip discharge flute: R1=0.16, R2=0.29, R3=0.29, R4=0.21
Drill shape: drill with the first convex curve CL1 and the first concave curve CL2 intersecting with each other depicted in the cross-sectional view of FIG. 4 and an end view of FIG. 3
Web thickness: 0.28D
Concave amount LF: 0.02D
Rake chamfer width LW: 0.05D
<TYPE-2 Drill>
Tool material: cemented carbide
Overall length: 100 mm
Flute length: 48 mm
Drill cutting diameter: 6 mmφ
Point angle: 140 degrees
Shape of chip discharge flute: R1=0.16, R2=0.29, R3=0.29, R4=0.21
Drill shape: drill with the first convex curve CL1 and the first concave curve CL2 smoothly continued depicted in a cross-sectional view of FIG. 14 and an end view of FIG. 15
Web thickness: 0.28D
Concave amount LF: 0.005D
Rake chamfer width LW: 0.09D
<Test Conditions>
Work material: S45C
Machining depth: 25 mm (through-hole)
Cutting speed: 100 m/min
Feed rate: 0.15 mm/rev
Step: none
Cutting oil: water-soluble coolant (oil feed inside drill)
Coolant: 1.5 MPa FIG. 16 depicts a durability test result; FIG. 17 depicts a chip shape from the TYPE-1 drill; and FIG. 18 depicts a chip shape from the TYPE-2 drill. As depicted in FIG. 16, in the hole machining using the TYPE-2 drill, the cutting edge of the drill cracked when the number of holes reaches 1500. However, in the hole machining using the TYPE-1 drill, the drill was not broken even when the number of holes reaches 2500. The durability life is at least increased by about 60%. Comparing the chip shape from the TYPE-1 drill depicted in FIG. 17 with the chip shape from the TYPE-2 drill depicted in FIG. 18, although the both chip shapes are curled in the same manner, the chip shape from the TYPE-1 drill is not provided with a needle-like projection and has a shorter overall length, while the chip shape from the TYPE-2 drill is disposed with a needle-like projection and has a relatively longer overall length, and therefore, the chips from the TYPE-2 drill are estimated to have relatively lower discharge property, which is considered to be the cause of the durability test result.

(Cutting Test 3)

Figure 21:
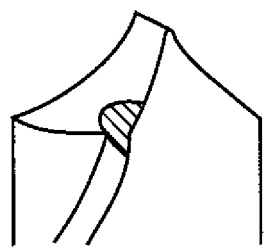
FIG. 21 is a diagram for specifically explaining a corner portion crack in the cutting test result.
Figure 22:
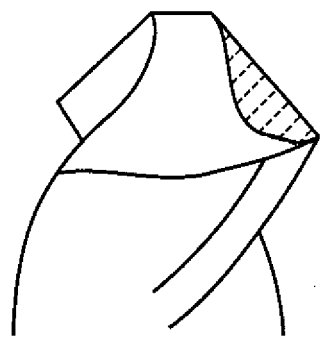
FIG. 22 is a diagram for specifically explaining significant wear in the cutting test result.
Figure 23:
FIG. 23 is a diagram for specifically explaining breakage of the drill in the cutting test result.

Eleven types of variations of the TYPE-1 drill used in the cutting test 2 were manufactured by way of trial as drills No. 1 to No. 12 as depicted in FIG. 19 and the drills No. 1 to No. 12 were used for cutting under the same conditions as the cutting test 2. FIG. 20 depicts test results of the drills No. 1 to No. 12. In FIG. 20, a circle indicates an excellent result and a triangle indicates a less favorable result as compared to a circle, while a cross mark indicates an unfavorable result. In FIG. 20, a corner portion crack indicates a cracked state in the part exemplarily illustrated in FIG. 21; significant wear indicates a significantly worn state of the part depicted in FIG. 22; and breakage indicates a broken state of the drill depicted in FIG. 23.

As depicted in the cutting test results of FIG. 20, the drills No. 1 to No. 3 produced excellent results in the chip shape, the thrust load, and the durability performance. In other words, chips were acquired in a shape having a shorter overall length without a needle-like projection as depicted in FIG. 17 with good discharge property, and the thrust load for feeding the drills in the axial center C direction was relatively light at the feed rate of 0.15 mm/rev in the cutting test 3. The durability performance same as the durability result depicted in TYPE-1 of FIG. 16 was acquired. However, the drills No. 4 to No. 12 produced less favorable results indicated by triangles or unfavorable results indicated by cross marks in at least one of the chip shape and the thrust load and had one of the drill breakage, the corner portion crack, and the significant wear in terms of durability performance evaluation.

The configurations of the drills No. 4 to No. 12 without good durability performance evaluation lead to the following analysis. First, the breakage of the drill No. 4 and the drill No. 11 due to clogging of chips is considered to be attributable to reduction in discharge property derived from an excessively small cross section area of the chip discharge flutes 18. In other words, it is estimated that the drill No. 4 has a radius ratio R3/R2 set to an excessively small value of 0.7, which makes the curvature radius R3 relatively smaller than the curvature radius R2, and therefore has an excessively small cross section area of the chip discharge flutes 18, and that the drill No. 11 has an excessively large web thickness of 0.42D and therefore has an excessively small cross section area of the chip discharge flutes 18. The breakage of the drill No. 5 and the drill No. 10 due to tool rigidity shortage is considered to be attributable to an insufficient drill cross section area. In other words, it is estimated that the drill No. 5 has the radius ratio R3/R2 set to an excessively large value of 1.3, which makes the curvature radius R3 relatively larger than the curvature radius R2, and therefore has an excessively small cross section area of the chip discharge flutes 18, and that the drill No. 10 has an excessively small web thickness of 0.13D and therefore has an excessively small cross section area of the chip discharge flutes 18. The corner portion crack of the drills No. 6 to No. 8 and No. 12 is considered to be attributable to the strength or rigidity shortage of the corner portion. In other words, it is considered that the drill No. 6 has the rake chamfer width LW set to an excessively small value of 0.005D and the curvature radius R1 of the first convex curve CL1 set to an excessively small value of 0.018D and therefore cannot achieve the strength of the corner portion. It is considered that the drill No. 7 has the radius ratio R3/R2 set to an excessively large value of 1.53 and the concave amount LF of the curvature radius R2 from the reference line K toward the rear side of the rotation direction set to an excessively large value of 0.06D and therefore cannot achieve the strength of the corner portion. It is considered that the drill No. 8 has the curvature radius R1 of the first convex curve CL1 set to an excessively large value of 0.42D, which makes the convexly-curved cutting edge portion 12a corresponding to the first convex curve CL1 close to a straight line because of a smaller swelling-out amount in the rotation direction, and therefore cannot achieve the strength of the convexly-curved cutting edge portion 12a, i.e., the strength of the corner portion. It is considered that the drill No. 12 has the curvature radius R2 set to an excessively small value of 0.12D and therefore tends to crack in the corner portion. The significant wear of the drill No. 9 is considered to be attributable to a lower cutting efficiency increasing a thrust load for maintaining a predetermined feed rate (0.15 mm/rev). In other words, it is considered that since the drill No. 9 has the concave amount LF of the curvature radius R2 from the reference line K toward the rear side of the rotation direction set to a negative value of −0.02D, the radius ratio R3/R2 set to an excessively small value of 0.56, which makes the value of the curvature radius R2 about twice larger than the curvature radius R3, the curvature radius R2 set to a large value of 0.52D, and the rake chamfer width LW set to an excessively large value of 0.09D, the cutting amount is made relatively smaller in the cutting edge 12 with the large curvature radius R2 on the rotation direction side relative to the reference line K, accordingly increasing the thrust load.

Considering each of the excessively large values or the excessively small values estimated as the causes of the insufficient durability performance of the drills No. 4 to No. 12, it is desirable that the concave amount LF of the first concave curve CL2 is within a range of 0.01D to 0.05D, that the rake chamfer width LW is within a range of 0.008D to 0.06D, that the web thickness is within a range of 0.15D to 0.4D, that the curvature radius R1 of the first convex curve CL1 is within a range of 0.02D to 0.4D, that the curvature radius R2 of the first concave curve CL2 is within a range of 0.15D to 0.5D, and that the curvature radius ratio R3/R2 between the first concave curve CL2 and the second concave curve CL3 is within a range of 0.75 to 1.25.

As described above, according to the drill 10 of this example, since the cross section orthogonal to the axial center C has the first convex curve CL1 corresponding to the convexly-curved cutting edge portion 12a and the first concave curve CL2 corresponding to the concavely-curved cutting edge portion 12b intersecting with each other at the intersection A, chips generated from the cutting edge 12 are curled and formed into a shape having no needle-like projection and accordingly relatively shortened in overall length and are smoothly discharged with enhanced discharge property and, therefore, the tool life of the drill 10 is further improved.

According to the drill 10 of this example, since the cross section orthogonal to the axial center C has the concave amount LF of the first concave curve CL2 set to 0.01D to 0.05D relative to the reference line K connecting the outer circumferential point B, at which the outer circumferential surface of the drill 10 intersects with the first convex curve CL1, and the axial center C defined as the drill center point, the chip shape is curled with a relatively shorter overall length and the durability performance is enhanced while the thrust load during cutting is reduced. If the concave amount LF of the first concave curve CL2 becomes less than 0.01D, the wear of the drill 10 increases and the durability performance deteriorates. If the concave amount LF of the first concave curve CL2 exceeds 0.05D, the corner portion of the drill cracks.

According to the drill 10 of this example, since the cross section orthogonal to the axial center C has the rake chamfer width LW of 0.008D to 0.06D (where D is a drill cutting diameter) that is a distance from the intersection E between a straight line orthogonal to the reference line K, which passes through the intersection A of the first convex curve CL1 and the first concave curve CL2, and the reference line K, to the outer circumferential point B, the chip shape is curled with a relatively shorter overall length and the durability performance is enhanced while the thrust load during cutting is reduced. If the rake chamfer width LW becomes less than 0.008D, the corner portion of the drill cracks. If the rake chamfer width LW exceeds 0.06D, the wear of the drill increases and the durability performance deteriorates.

According to the drill 10 of this example, since the rake angle θ is negative that is an angle between the reference line K and the first convex curve CL1 at the outer circumferential point B, the corner portion corresponding to the vicinity of the outer circumferential point B is enhanced in strength and prevented from cracking, and the durability performance of the drill 10 is enhanced.

Since the drill 10 of this example has the web thickness CD of 0.15D to 0.4D, the transverse strength of the drill is enhanced within a range of the achieved chip discharge property and, therefore, the durability performance of the drill is enhanced. If the web thickness CD becomes less than 0.15D, the strength is reduced and the drill is broken. If the web thickness CD exceeds 0.4D, the chip discharge flute becomes relatively small and poor discharge of chips generates clogging, which causes the breakage of the drill.

According to the drill 10 of this example, since the cross section orthogonal to the axial center C has the inner wall surface of the chip discharge flute 18 on the side of rotation direction opposite to the drill rotation direction made up of the second concave curve CL3 formed on the inner circumferential side and the second convex curve CL4 formed on the outer circumferential side adjacently to the second concave curve CL3, and the second convex curve CL4 reaches the heel portion, the chip shape is curled with a relatively shorter overall length and the durability performance is enhanced while the thrust load during cutting is reduced, and since the first convex curve and the second convex curve respectively reinforce the corner portion corresponding to the both end portions, i.e., the heel portion and the margin portion, of an opening edge opened in a C-shape or a U-shape in the tip surface of the chip discharge flute 18, the corner portion and the margin portion is prevented from cracking and the durability of the drill is enhanced.

Since the drill 10 of this example is set to R1: 0.02D to 0.4D and R2: 0.15D to 0.5D when R1 is the curvature radius of the first convex curve CL1 and R2 is the curvature radius of the first concave curve CL2, the chip shape is curled with a relatively shorter overall length and the durability performance is enhanced while the thrust load during cutting is reduced. If R1 becomes less than 0.02D or exceeds 0.4D, the thrust load is increased. If the curvature radius R2 becomes less than 0.15D, the corner portion easily cracks and if exceeding 0.5D, the wear becomes significant.

Since the drill 10 of this example has a radius ratio between the curvature radius R2 of the first concave curve CL2 and the curvature radius R3 of the second concave curve CL3 within a range of 0.75≤R3/R2≤1.25, the chip discharge flute is formed into a cross section shape having a size without clogging of chips within a range in which the rigidity of the drill 10 is ensured. If R3/R2 becomes less than 0.75, the cross section area of the chip discharge flute becomes too small and the clogging of chips occurs and causes the breakage of the drill. If R3/R2 exceeds 1.25, the cross section area of the chip discharge flute becomes larger and the cross section area of the drill main body becomes smaller, causing the breakage of the drill due to rigidity shortage.

Although the example of the present invention has been described in detail with reference to the drawings, the present invention is applied in other forms.

For example, although the first convex curve CL1 and the first concave curve CL2 intersecting at the intersection A are arcs having the curvature radiuses R1 and R2 in the drill 10 of this example, the curves may not necessarily be arcs.

Although the flute portion 16 of the drill 10 of this example is provided with the pair of the chip discharge flutes 18 twisted clockwise around the axial center C at the predetermined helix angle γ (e.g., about 30 degrees), the present invention is applicable to various drills such as a twist drill having the chip discharge flutes 18 twisted anti-clockwise around the axial center C, a straight cutting edge drill having the chip discharge flutes 18 parallel to the axial center C, a drills having the one, two, three or more chip discharge flutes 18, and a double margin drill having one land disposed with two margins.

Although the drill 10 of this example is disposed with the oil hole 22 longitudinally passing therethrough in the axial center C direction, the oil hole 22 may be disposed as needed depending on quality etc., of a work material. The margin 20 may not necessarily be disposed.

Although the cross section orthogonal to the axial center C of the drill 10 of this example has the inner wall surface of the chip discharge flute 18 toward the side opposite to the rotation direction made up of the second concave curve CL3 formed on the inner circumferential side and the second convex curve CL4 formed on the outer circumferential side adjacently to the second concave curve CL3, and the second convex curve CL4 is set to reach the heel portion of the land 24, the second convex curve CL4 is for the purpose of reinforcing the heel portion of the land 24 and therefore may not be curved or may be removed as needed depending on a material. Since the second concave curve CL3 is a portion less involved with the formation of curling of chips and may be provided to the extent that a gap from a chip is formed, the curvature radius R3 may be changed within a range not affecting the curling of chips and the discharge of chips.

Although the drill 10 of the example is made of base material that is super hard tool material such as cemented carbide, another tool material such as high-speed steel is also employable. Intermetallic compounds, a diamond film, etc., are employable as a hard film disposed on the base material for enhancing cutting durability.

The suitable intermetallic compounds are metals of the groups IIIb, IVa, Va, and VIa of the periodic table of the elements, for example, carbides, nitrides, and carbonitrides of Al, Ti, V, Cr, etc., or mutual solid solutions thereof and, specifically, TiAlN alloy, TiCN alloy, TiCrN alloy, TiN alloy, etc., are preferably used. Although a hard film of such an intermetallic compound is preferably disposed by a PVD method such as an arc ion plating method and a sputtering method, the hard film may be disposed by another film formation method such as a plasma CVD method.

The above description is merely an embodiment of the present invention and the present invention may be implemented in variously modified and improved forms based on the knowledge of those skilled in the art within a range not departing from the spirit thereof.

NOMENCLATURE OF ELEMENTS

10: drill
12: cutting edge
12a: convexly-curved cutting edge portion
12b: concavely-curved cutting edge portion
CL1: first convex curve
CL2: first concave curve
18: chip discharge flute
28: second clearance (outer circumferential surface of the drill)
32: second flank (tip flank)
34: third flank (tip flank)
A: intersection of the first convex curve and the first concave curve
B: outer circumferential point
C: axial center (drill center point)
LF: concave amount of the first concave curve
LW: rake chamfer width
K: reference line
θ: rake angle
R1, R2, R3, R4: curvature radius
CL3: second concave curve
CL4: second convex curve

The invention claimed is:

1. A drill comprising:
a chip discharge flute opened in a tip surface; and
a cutting edge formed at an intersecting portion between an inner wall surface of the chip discharge flute on a side of a drill rotation direction and a tip flank formed on the tip surface, the cutting edge being made up of a concavely-curved cutting edge portion formed on an inner circumferential side and a convexly-curved cutting edge portion formed on an outer circumferential side,
a cross section orthogonal to an axial center having a first convex curve corresponding to the convexly-curved cutting edge portion and a first concave curve corresponding to the concavely-curved cutting edge portion intersecting with each other at an intersection, and a ridgeline being formed at the intersection.

2. The drill of claim 1, wherein the cross section orthogonal to the axial center has a concave amount of 0.01D to 0.05D that is a distance from a reference line connecting an outer circumferential point, at which an outer circumferential surface of the drill intersects with the first convex curve, and a drill center point, to a line that is tangent to the first concave curve and that is parallel to the reference line, wherein D is an outer diameter of the drill.

3. The drill of claim 2, wherein the cross section orthogonal to the axial center has a rake chamfer width of 0.008D to 0.06D that is a distance from an intersection between a straight line orthogonal to the reference line, which passes through the intersection of the first convex curve and the first concave curve, and the reference line, to the outer circumferential point.

4. The drill of claim 2, wherein a rake angle is negative and is an angle between the reference line and a line that is tangent to the first convex curve at the outer circumferential point.

5. The drill of claim 1, wherein the drill has a web thickness of 0.15D to 0.4D, wherein D is an outer diameter of the drill.

6. The drill of claim 1, wherein the cross section orthogonal to the axial center has an inner wall surface of the chip discharge flute on a side of rotation direction opposite to the drill rotation direction made up of a second concave curve formed on an inner circumferential side and a second convex curve formed on an outer circumferential side adjacently to the second concave curve, and wherein the second convex curve reaches a heel portion.

7. The drill of claim 6, wherein when R1, R2, R3, and R4 are a curvature radius of the first convex curve, a curvature radius of the first concave curve, a curvature radius of the second concave curve, and a curvature radius of the second convex curve, respectively, the drill is set to
R1: 0.02D to 0.4D and
R2: 0.15D to 0.5D, wherein D is an outer diameter of the drill.

8. The drill of claim 7, wherein a relationship between the curvature radius of the first concave curve and the curvature radius of the second concave curve is
$0.75 \leq R3/R2 \leq 1.25$.

* * * * *